United States Patent [19]

Shafer

[11] Patent Number: 5,370,148

[45] Date of Patent: Dec. 6, 1994

[54] BUTTERFLY VALVE ASSEMBLY AND METHOD OF MANUFACTURE

[76] Inventor: Terry C. Shafer, 101 Industrial, Perryton, Tex. 79070

[21] Appl. No.: 232,506

[22] Filed: Apr. 25, 1994

[51] Int. Cl.⁵ ............................................. F16K 1/22
[52] U.S. Cl. ...................................... 137/15; 251/306
[58] Field of Search .................. 251/305, 306; 137/15

[56] References Cited

U.S. PATENT DOCUMENTS

| | | | |
|---|---|---|---|
| 3,250,510 | 5/1966 | Williams | 251/306 X |
| 3,306,316 | 2/1967 | Stillwagon | 251/306 X |
| 3,913,610 | 10/1975 | Paptzun | 251/305 X |

Primary Examiner—John C. Fox
Attorney, Agent, or Firm—Milburn & Peterson

[57] ABSTRACT

A butterfly valve assembly of plastic material for use in a plastic piping system. The valve body is made from thermoplastic wherein the valve seat has a hard core of phenolic or another plastic and a resilient cover. The plastic valve body utilizes a retainer ring in its construction to maintain pressure on the valve seat which aids in sealing the valve closure thereagainst. The closure disc may be of metal or plastic depending on the service contemplated. The closure disc is retained in the valve body by a lower valve stem which is affixed in the valve body to permit free rotation of the closure disc thereon and an upper valve stem which includes a central retainer ring and is supported by a housing on the valve body. The housing has a bushing that seats against the retainer ring and a tubular plug which seats in the housing exerting pressure against the bushing, and thus, against the central retainer ring to assist in blow-out protection. The tubular plug is sealed by an internal o-ring to the upper valve stem. The upper and lower valve stems are sealed to the hard core body of the valve seat. The valve seat is sealed in the valve body by a pair of o-rings on opposite sides of the valve stems. The upper valve stem is keyed to rotate the closure disc by a handle arrangement. The valve is operable through 360° range and has a locking pin to hold the valve fully open, or fully closed, or at various intermediate positions. The valve may be installed in either direction in a piping system.

20 Claims, 3 Drawing Sheets

BUTTERFLY VALVE ASSEMBLY AND METHOD OF MANUFACTURE

BACKGROUND OF INVENTION

This invention relates to a butterfly valve and the method of manufacture and in particular to a multi directional butterfly valve made from plastic, such as, polyethylene, polypropylene and similar materials.

The use of butterfly valves in various applications including pipeline service in the oil and gas industry are well known. Such butterfly valves are useful in gathering pipelines, as well as, transmission and distribution pipelines. Previously, butterfly valves have primarily been made from metallic material, such as, stainless steel, carbon steel, etc., and more recently plastic has come into use for manufacturing butterfly valves.

In relatively high pressure service, e.g. 160 PSI or more, sealing between the valve body and the flow control valve disc is difficult and frequently leaking occurs around the disc and in some cases the control valve stem is subject to being blown out because of faulty seals.

The problem with sealing in butterfly valves has been approached in various manners. U.S. Pat. No. 2,987,072, to Muller describes a butterfly valve which uses a sealing element that seats in a circumferential groove in the valve body. The sealing means comprises a continuous elastomer with an integral pair of eyelets diametrically opposed from each other which are rotated 90° to accommodate the valve shaft to provide sealing between the shaft and the valve body.

U.S. Pat. No. 3,329,394, to Overbaugh, although directed to a lockable valve handle, discloses a resilient valve seat for sealing the valve when it is closed and o-rings to seal the valve stem.

U.S. Pat. No. 3,726,503, discloses a butterfly valve with a pressure seal. The seal consists of two members arranged to contact the valve disc when the valve is closed and the two members of the seal are so constructed that fluid under pressure may pass between the interface of the two members to the radially outermost side arranged to exert pressure against the outermost sides of the two members, thus causing additional sealing pressure against the periphery of the valve disc.

The problems associated with valve manufactured from plastic, such as, polyethylene are outlined in U.S. Pat. No. 4,348,006 granted to Schmitt, et al. Schmitt points out that the valve seat requires the use of elastomeric material, although such materials have a tendency to creep or migrate when subjected to high pressure especially with pressure applied to the seat on one side of the closure disc only. This problem has caused industry to use reinforcing members in the seat. Schmitt states that the known arrangements for maintaining a seal directly on a valve body of polyethylene are considered ineffective and permit leakage past the closure. Schmitt's solution to the problem is to provide a valve assembly that includes a valve body of plastic material in which the valve seat includes a metallic sleeve member molded in the plastic valve body in such a fashion as to lock the metallic sleeve member in the plastic valve body to prevent separation therebetween. The valve stem is sealed by a pair of o-rings separated by spacer members surrounding the valve stem and retained about the valve stem by a metallic retainer having a serrated periphery embedded in the body of the annular portions.

SUMMARY OF INVENTION

In accordance with the present invention, the valve assembly includes a valve body having radial apertures to accommodate upper and lower stems for rotably supporting a closure disc within the valve body and is cast or molded to accommodate a composite valve seat. The composite valve seat has a hard core, i.e. a phenolic compound, with a resilient compound bonded or molded thereon. The hard core of the valve seat is designed to engage a pair of o-rings in the valve body to seal the seat to the valve body. The hard core of the seat also includes a pair of o-rings which seal upper and lower stems of a valve closure to avoid leakage. A retaining ring of the same thermoplastic as the valve body is positioned in the valve body to retain the valve seat compressed within the valve body. Reducers of the same thermoplastic as the valve body and retaining ring are then fused to the valve body on one side and to the valve body and retaining ring on the other side. This arrangement applies pressure to the resilient cover of the valve seat which together with the mass of the valve body lessons the problem of leakage past the seat when the valve is closed. The reducers also accommodate installation in a plastic piping system.

The valve is assembled by placing o-rings in the grooves in the valve body, and then the valve seat with o-rings installed to seal the valve stems is aligned within the valve body to accommodate the upper and lower valve stems extending through the valve body and seat. Next the valve closure disc is positioned in the valve seat and the valve stems inserted through the valve body, the o-rings in the valve seat, the valve seat, and then into the closure disc. The lower valve stem is plug welded in place in the valve body. The upper valve stem which is keyed to seat in the valve closure disc for rotating the valve closure disc has a cap surrounding it which is designed to maintain the upper valve stem in position and provide additional sealing to the upper valve stem. The cap is made of the same plastic material as the valve body. The upper valve stem has a peripheral groove which accommodates a retaining ring. A bushing is positioned in the cap to rest against the retaining ring and a nut is threaded into the cap to hold the bushing in place biased against the retaining ring. The nut also includes an annular groove to accommodate an o-ring for sealing to the upper valve stem. The cap is formed with a flange having a series of axially aligned holes therethrough. The upper valve stem is provided with a handle to rotate the upper valve stem hence the valve closure disc. The handle is provided with a pin which is inserted through a hole in the handle into one of the axially aligned holes in the cap flange to secure the valve fully closed or fully opened or in any intermediate position. The valve closure disc may be rotated throughout 360°, consequently, the valve may be installed in either direction in the pipeline for controlling the flow therein. The valve assembly, including the reducers may be readily installed in a pipeline by normal thermoplastic fusion technique. Furthermore, the reducers may be fitted with a metallic sleeve in accordance with my earlier U.S. Pat. No. 5,139,290 to accommodate connection in the pipeline with a mechanical clamp, such as, a Victaulic Clamp.

The valve closure disc and valve stems may be cast metal or plastic depending on the service in which they would be used.

The present invention provides a butterfly valve which is rotable throughout 360° and provides a seal between the valve closure disc and the seat in such a fashion that the high pressure side of the seat would increase the sealing force by pressurizing the resilient seat between it's core and valve body to increase the force of the resilient seat against the valve seat. The valve also includes a unique cap assembly for retaining the upper valve stem in place and reducing the chance of the valve stem being blown out.

Further, the present invention provides a butterfly valve which is rotable throughout 360° and includes a composite valve seat having a hard plastic core with a resilient cover which is maintained compressed within the valve body wherein the hard core is of a material, such as phenolic, which has a lesser coefficient of elasticity than the valve body and consequently, in high pressure service, notwithstanding the greater coefficient of elasticity of the valve body, sealing forces between the closure disc and the valve seat are increased by the resilient cover being compressed against the hard core and the closure disc.

Still further, the present invention provides a butterfly valve which is rotable throughout 360° and includes a composite valve seat having a hard plastic core with a resilient cover which is maintained compressed within the valve body wherein the plastic core of the valve seat is of a material, such as phenolic, which has a lesser coefficient of expansion than the valve body and consequently, in high temperature service, notwithstanding the greater coefficient of expansion of the valve body, the sealing forces between the closure disc and the valve seat are sustained.

These and other objects and advantages of the present invention will be more completely described herein with reference to the accompanying drawings.

DESCRIPTION OF PREFERRED EMBODIMENT

Figure 1:
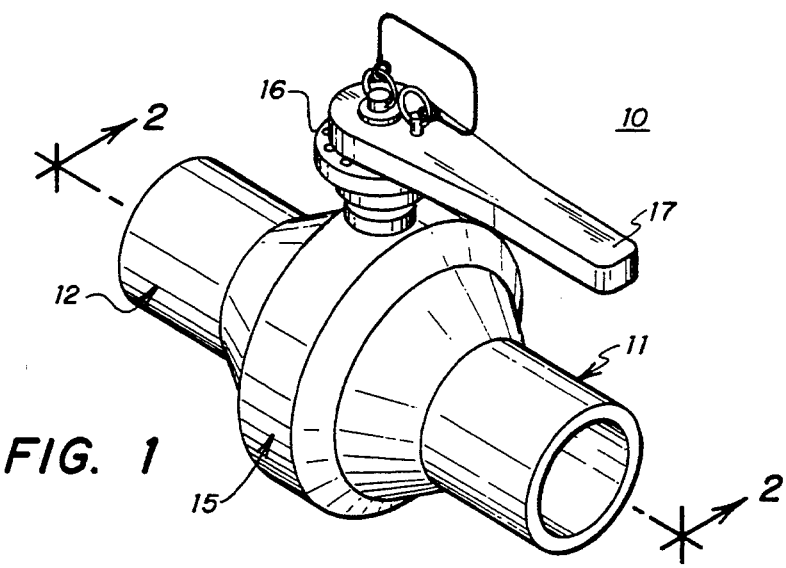
FIG. 1 is an perspective view of the valve assembly.
Figure 2:
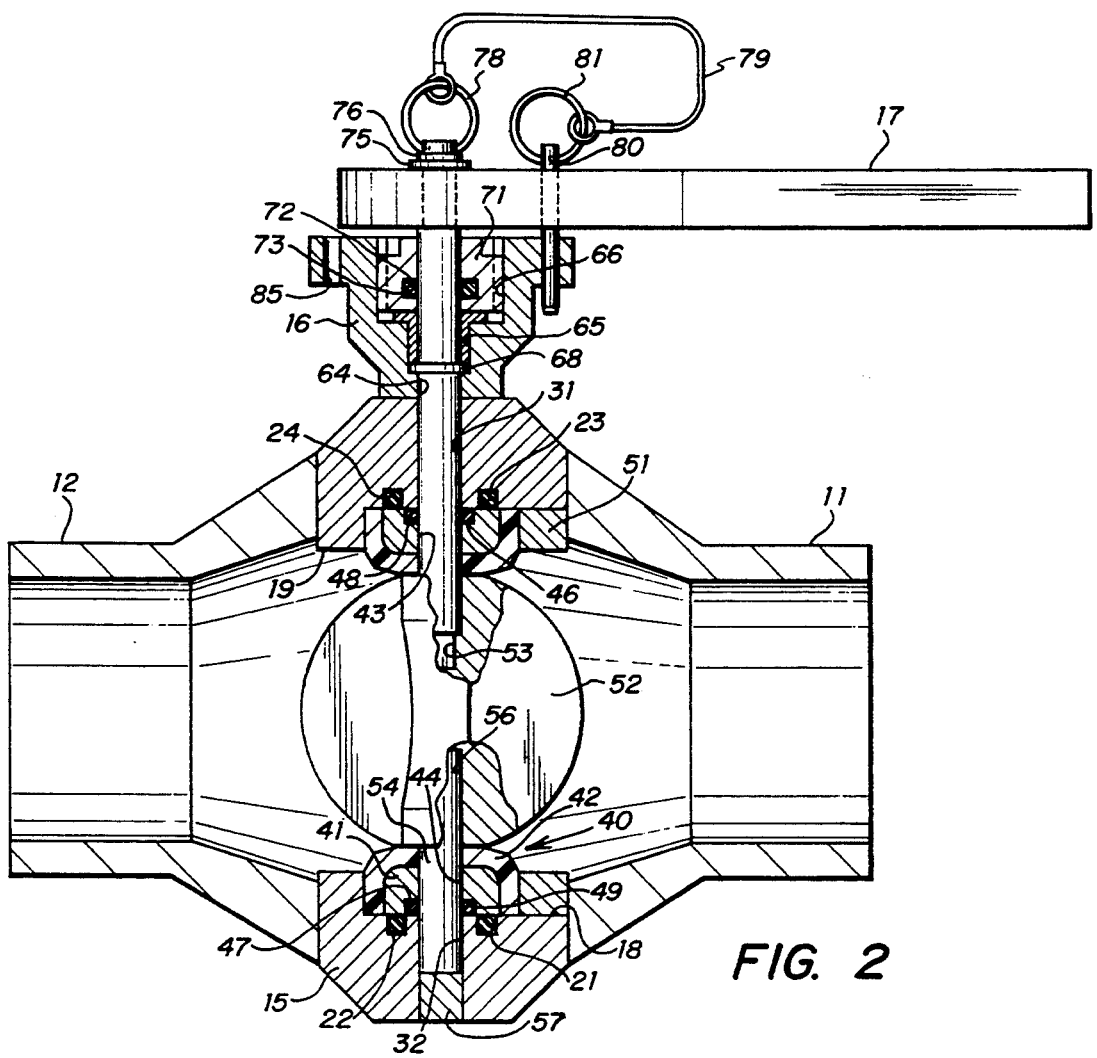
FIG. 2 is a cross-sectional view taken along 2—2 in FIG. 1, and illustrates the valve assembly internal details.
Figure 3:
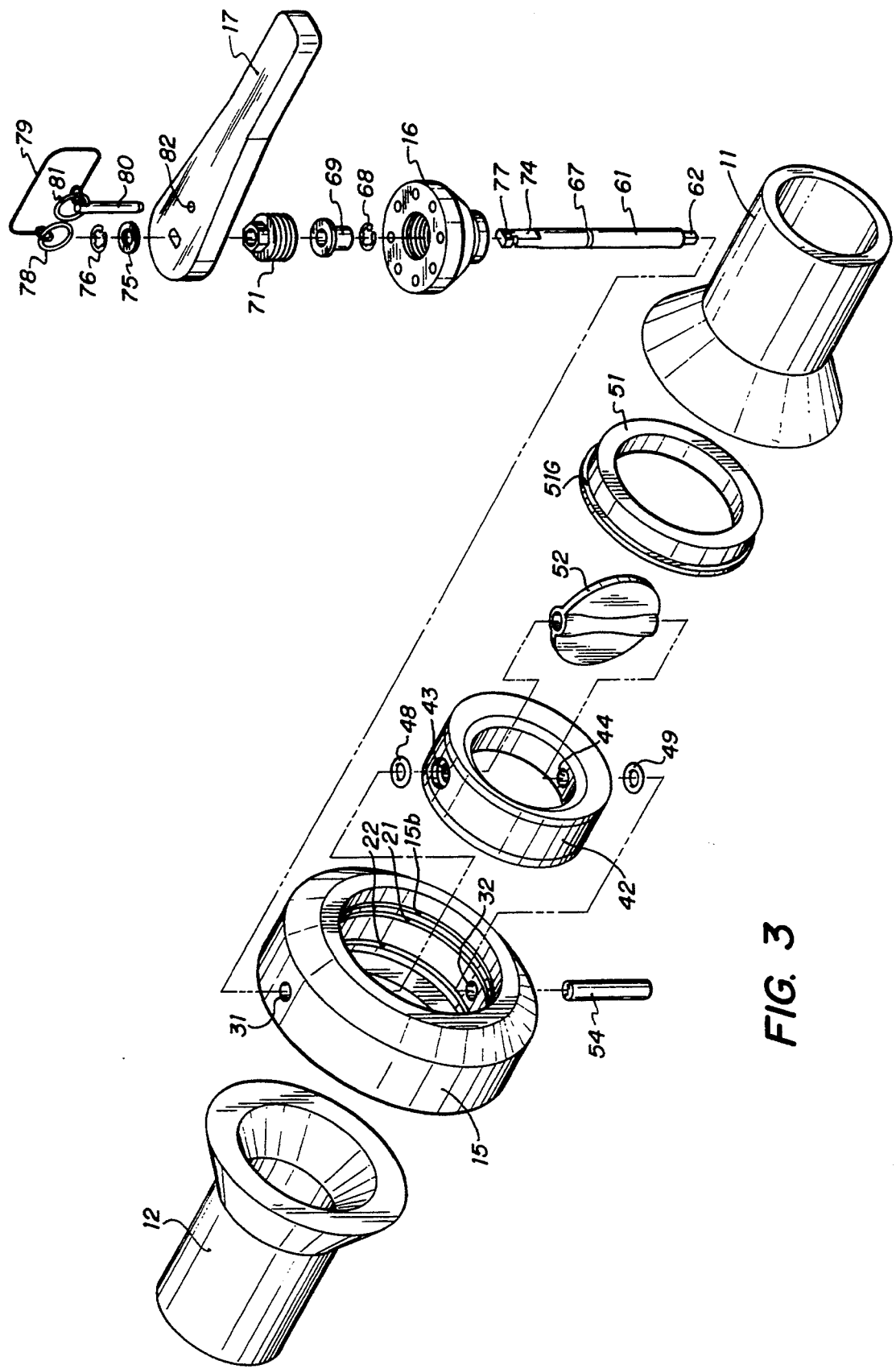
FIG. 3 is an exploded perspective view of the valve assembly illustrating the various details of the valve assembly.
Figure 4:
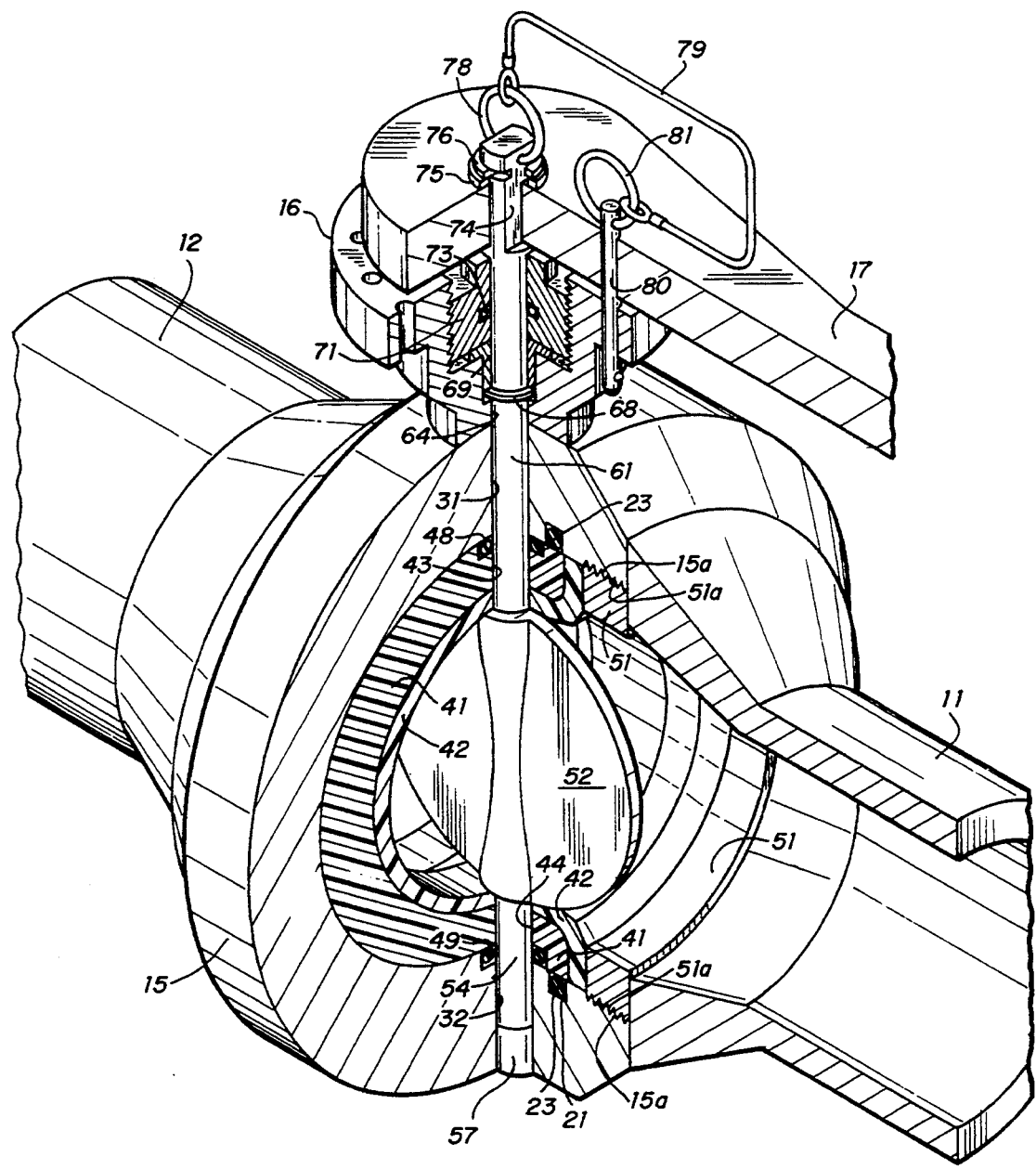
FIG. 4 is a perspective three-quarter view of the valve assembly.

Referring now to the drawings and in particular FIG. 1. The preferred embodiment of the invention is illustrated as valve assembly 10 in perspective having a valve body 15 and a pair of flared reducers 11 and 12 which connect to the valve body 15 to properly size the valve assembly 10 to connect into a piping system (not shown). The valve assembly 10 has a cap 16 and a valve handle 17 for operating the valve assembly 10. Referring to FIGS. 2, 3 and 4, valve body 15 is a cylindrical member having a counterbore 18 to form a shoulder 19. Counterbore 18 has a pair of internal circumferential grooves 21 and 22 which seat o-rings 23 and 24, respectively. Intermediate internal circumferential grooves 21 and 22, valve body 15 has diametrically opposed radial apertures 31 and 32.

Valve seat 40 is ring shaped and includes a hard core 41 with a resilient cover 42 on its internal periphery and opposing sides which is bonded to the hard core 41. Valve seat 40 has a pair of diametrically opposed radial bores 43 and 44 which are the same diameter as diametrically opposed radial apertures 31 and 32 in valve body 15. Bores 43 and 44 in valve seat 40 are counterbored to form shoulders 46 and 47, respectively, which accommodate o-rings 48 and 49.

Valve seat 40 is positioned in valve body 15 with bores 43 and 44 aligned with apertures 31 and 32, and retainer ring 51 is positioned in valve body 15 against valve seat 40. Closure disc 52 is positioned within the valve body 15 and valve seat 40 with such that keyway 53 is in radial alignment with bore 43 and aperture 31. Lower valve stem 54 for closure disc 52 is positioned through aperture 32, bore 44 and into circular stem hole 56 in closure disc 52 and is maintained in place by plug 57 in aperture 32 of valve body 15 and permits free rotation of closure disc 52. Upper valve stem 61 has a key 62 which seats in keyway 53 of closure disc 52.

Cap 16 is positioned upon valve body 15 and has a bore 64 which is the same diameter as aperture 31. Cap 16 is counterbored to form shoulders 65 and 66. Upper valve stem 61 includes an annular groove 67 with stem retainer 68 positioned therein seated on shoulder 65. Bushing 69 is positioned in cap 16 abutting stem retainer 68. Nut 71 includes an internal o-ring groove 72 fitted with an o-ring 73 which provides a seal with upper valve stem 61 extending therethrough. Nut 71 is threaded into cap 16 and seated against bushing 69. Upper valve stem 61 has a key 74 which accommodates handle 17 which is held in place on upper valve stem 61 by a washer 75 and retainer ring 76. Key 74 has an aperture 77 through which ring 78 is attached. A lanyard 79 is attached to ring 78 at one end and locking pin 80 by ring 81 at the other end. An aperture 82 in handle 17 is provided for locking pin 80 to be positioned through handle 17 and into one of the series of apertures 85 in cap 16.

The valve assembly 10 is assembled in the following manner. O-rings 23 and 24 are positioned in internal circumferential grooves 21 and 22, respectively, of valve body 15. Valve seat 40 with o-rings 48 and 49 seated within shoulders 46 and 47 of hard core 41 is positioned in valve body 15 with resilient cover 42 engaging shoulder 19 on one side, and then retainer ring 51 is positioned in valve body 15 abutting resilient cover 42 on the other side. Reducer 12 is butt fused to valve body 15 adjacent to shoulder 19 and reducer 11 is butt fused to valve body 15 and retainer ring 51. The retainer ring 51 is of sufficient thickness to compress the resilient cover 42 of valve seat 40 during the butt fusion process.

The closure disc 52 is positioned with keyway 53 radially aligned with bore 43 and aperture 31 and the circular stem hole 56 is positioned with radial alignment with bore 44 and aperture 32. Lower valve stem 54 is placed within aperture 32 and bore 44 and into circular stem hole 56. Then, plug 57 is affixed in aperture 32 abutting lower valve stem 54. In this manner lower valve stem 54 is fixed in closure disc 52 and permits free rotation thereof. Then, stem retainer 68 is placed in annular groove 67 of upper valve stem 61. Next upper valve stem 61 is placed within aperture 31 and bore 43 with stem retainer 68 seated against shoulder 65 in cap 16 and key 62 seated in keyway 56 of closure disc 52. Bushing 69 is positioned over upper valve stem 61 and seated against stem retainer 68. Then, o-ring 73 is positioned in internal o-ring groove 72 in nut 71, and then nut 71 is threaded into cap 16 and firmly seated against bushing 69 which in turn provides a biasing force on stem retainer 68 to prevent upper valve stem 61 from being unseated from closure disc 52. 0-ring 73 seals nut 71 to upper valve stem 61. Handle 17 is installed over key 74 of upper valve stem 61 and held in place by washer 75 secured by retainer ring 76. One end of a lanyard 79 is attached to upper valve stem 61 in aperture 77 by ring 78, locking pin 80 is attached by ring 81 to the other end of lanyard 79 and may be inserted through aperture 82 in handle 17 and into one of the apertures 85 in cap 16 to secure the closure disc 52 fully closed, fully open or in an intermediate position.

Valve assembly 10 has been illustrated with retainer ring 51 being a symmetrical cylinder the diameter of the counterbore in valve body 15. It will be understood that retainer ring 51 could be mated to valve body 15 by forming internal threads 15a on valve body 15 and external threads 51a on retainer ring 51 in which case retainer ring 51 would be screwed into valve body 15 and compress resilient cover 42 of valve seat 40 between shoulder 19 and retainer ring 51. Also, retainer ring 51 could be mated with valve body 15 by providing retainer ring 51 with a circumferential lip 51G and valve body 15 with an additional circumferential groove 15b. To install retainer ring 51 with the lip 51G and groove 15b configuration, valve body 15 would be placed in boiling water to allow the thermoplastic to expand and then retainer ring 51 would be snapped in place and again compressing resilient cover 42 between shoulder 19 and retainer ring 51.

The various components of valve assembly 10 can be made from various thermoplastic materials which are susceptible to molding and machining and of sufficient mass or thickness to maintain their shape during use, preferably, such thermoplastics are polyethylene, polypropylene and the like. The valve body 15, cap 16, reducers 11 and 12 and retainer ring 51 should preferably be of the same thermoplastic. The hard core 41 of valve seat 40 is made from a hard phenolic compound or other hard plastic about which resilient cover 42 may be attached. Typical resilient materials for resilient cover 42 are Buna N, Viton, and EDPM. Closure disc 52 is preferably made by investment casting stainless steel with upper valve stem 61 and lower valve stem 54 of like material. Nut 71 is made of thermoplastic and may also be glass filled for added strength. The plastic for the nut 71 may be different from the material of valve body 15 and cap 16, however, preferably it is made of the same material. The bushing 69 may be made from brass, Teflon, phenolic or ultra high molecular polyethylene. Closure disc 52 may also be made from plastic material. Other handle arrangements for locking the valve assembly in the fully opened, fully closed or any intermediate position would be acceptable and the valve handle and locking pin arrangement are merely illustrative of a suitable latching assembly. It will be further understood that the valve may be inserted in either direction of the flow line and the valve may be operated throughout a full 360° range.

In normal operating service with valve assembly 10 in the fully closed position, closure disc 52 is seated against the valve seat 40. Considering the high pressure side of the valve assembly 10 is the side including reducer 12, and knowing, the coefficient of elasticity of reducer 12 and valve body 15 are greater than the coefficient of elasticity of the hard core 41, then pressure asserted on the high pressure side will compress the resilient cover 42 against the hard core 41 and closure disc 52 to increase the sealing forces between the valve seat 40 and closure disc 52, notwithstanding the high coefficient of elasticity of the reducers 11 and 12 and the valve body 15. It should be understood that the pressure on the high side is exerted equally against the interior wall of reducer 12, the shoulder 19 of valve body 15, the resilient cover 42 and the closure disc 52 however, the hard core 41 being less expandable than the valve body 15 decreases the pressure exerted against the more central area of valve body 15 thereby aiding in retention of the seal by o-rings 23 and 24.

The plastic hard core 41 of valve seat 40 is of a material with a lesser coefficient of expansion than the valve body 15 and reducers 11 and 12. In high temperature service, the differential in the expansion of hard core 41 of valve seat 40 and valve body 15 and reducers 11 and 12 is minimal enough that o-rings 23 and 24 maintain a seal between the hard core 41 of valve seat 40 and valve body 15 thus sustaining the sealing forces between the closure disc 52 and the valve seat 40.

The preferred embodiment of the present invention has been disclosed in detail with some various optional techniques of manufacturing the valve assembly. It will be appreciated that other techniques of manufacturing the valve assembly are well known to those skilled in the art and it is intended that those techniques and materials are included within the scope of the present invention.

What is claimed is:

1. a butterfly valve comprising:

a cylindrical valve body of plastic material having an internal shoulder at one end therein, two spaced apart circumferential internal grooves and two diametrically opposed radial apertures between the circumferential grooves;

a valve seat positioned against said internal shoulder, said valve seat having a hard core of plastic material and a resilient cover bonded to said core, and two diametrically opposed radial bores substantially the same diameter as the radial apertures, said radial bores being counterbored at the periphery of said valve seat, said valve seat sealed to said valve body by o-rings in said circumferential grooves;

a retainer ring of plastic material seated against said valve seat to compress the valve seat between the shoulder and retainer ring;

a disc for sealing engagement with the valve seat having a round stem hole and a keyed stem hole diametrically opposed to the round stem hole, the disc being retained in the valve body by a round stem affixed in one of the apertures and extending through one of the radial bores into the round stem hole and a keyed stem seated in the keyed stem hole and extending through the other radial bore and aperture and radially outward from said valve body, said stem and keyed stem sealed to said valve body by o-rings in the counterbores of said valve seat; and a member attached to said keyed stem for rotating the disc throughout a 360° range.

2. The butterfly valve of claim 1 having a first reducer of plastic material affixed to the end of the valve body juxtaposed to the internal shoulder and a second reducer of plastic material affixed to the other end of the valve body and the retainer ring to adapt the valve for installation in a plastic piping system.

3. The butterfly valve of claim 2 wherein the valve body, retainer ring, first reducer and second reducer are of the same plastic material of one of polyethylene and polypropylene.

4. The butterfly valve of claim 1 wherein the valve body and the retainer ring are of the same plastic material of one of polyethylene and polypropylene.

5. The butterfly valve of claim 1 having a cap assembly affixed to said valve body surrounding the keyed stem, said keyed stem having an annular groove thereabout with a stem retainer in said groove, said cap assembly comprising;
   a cap,
   a throughbore within said cap having a first and second shoulder therein,
   a bushing surrounding the keyed stem and in engagement with said stem retainer and said second shoulder; and
   a tubular plug having an internal peripheral groove with an o-ring retained therein affixed within said cap such that the tubular plug engages the bushing forcing the stem retainer against said first shoulder, said tubular plug being sealed by the internal o-ring to said keyed stem.

6. In a butterfly valve assembly having a body of plastic material, a disc for closing a passageway therethrough, a round stem affixed to the valve body for supporting the disc, a keyed stem supported in the valve body for rotating the disc throughout 360°, the improvement comprising:
   the cylindrical valve body having an internal shoulder at one end, and a pair of internal peripheral grooves;
   a valve seat within said valve body having core of hard plastic with a sealing surface of resilient material bonded thereto for engagement with the disc, said valve seat sealed to said valve body by o-rings in said peripheral grooves, said valve seat having radial bores surrounding the round stem and the keyed stem therein, said bores having counterbores with o-rings therein for sealing the round stem and the keyed stem to the valve seat; and
   a retainer ring for biasing said valve seat between the shoulder and the retainer ring.

7. The butterfly valve of claim 6 having a first reducer of plastic material affixed to the end of the valve body juxtaposed to the internal shoulder and a second reducer of plastic material affixed to the other end of the valve body and the retainer ring to adapt the valve for installation in a plastic piping system.

8. The butterfly valve of claim 7 wherein the valve body, retainer ring, first reducer and second reducer are of the same plastic material of one of polyethylene and polypropylene.

9. The butterfly valve of claim 6 wherein the valve body and the retainer ring are of the same plastic material of one of polyethylene and polypropylene.

10. The butterfly valve of claim 6 having a cap assembly affixed to said valve body surrounding the keyed stem, said keyed stem having an annular groove thereabout with a stem retainer in said groove, said cap assembly comprising;
    a cap,
    a throughbore within said cap having a first and second shoulder therein,
    a bushing surrounding the keyed stem and in engagement with said stem retainer and said second shoulder; and
    a tubular plug having an internal circular groove with an o-ring retained therein affixed within said cap such that the tubular plug engages the bushing forcing the stem retainer against said first shoulder, said tubular plug being sealed by the internal o-ring to said keyed stem.

11. The butterfly valve of claim 10 having a first reducer of plastic material affixed to the end of the valve body juxtaposed to the internal shoulder and a second reducer of plastic material affixed to the other end of the valve body and the retainer ring to adapt the valve for installation in a plastic piping system.

12. The butterfly valve of claim 11 wherein the valve body, retainer ring, first reducer and second reducer are of the same plastic material of one of polyethylene and polypropylene.

13. The butterfly valve of claim 10 wherein the valve body and the retainer ring are of the same plastic material of one of polyethylene and polypropylene.

14. The butterfly valve assembly of claim 6 wherein the core of hard plastic is of a material having a lesser coefficient of expansion than the valve body.

15. A method of manufacturing a valve assembly comprising:
    forming a valve body of thermoplastic material having an internal shoulder at one end and two spaced apart internal circumferential grooves, and a pair of diametrically opposed apertures intermediate said internal circumferential grooves;
    forming a composite valve seat having a rigid plastic core and a resilient cover, and having a pair of diametrically opposed bores therethrough that are counterbored in the rigid plastic to accommodate o-rings therein;
    positioning o-rings in the circumferential grooves of the valve body and in the counterbores of the valve seat;
    placing said valve seat against the shoulder in said valve body;
    affixing a retainer ring of thermoplastic material within said valve body against said valve seat compressing the resilient cover of said valve seat between the shoulder and the retainer ring;
    installing a closure disc having a keyed stem hole and a round stem hole in said valve body by affixing a round stem within one aperture and bore and extending into the round stem hole of the closure disc, and supporting a keyed stem seated in the keyed stem hole through the other bore and aperture with the keyed stem extending from the valve body;
    securing a handle to said keyed stem for rotating the stem throughout 360°.

16. The method of claim 14 wherein said keyed stem has an annular groove formed about it's periphery and the further steps including:
    forming a cap of thermoplastic material on said valve body surrounding the keyed stem extending radially from the valve body with said cap having a first and second internal shoulder therein;
    inserting a stem retainer within said annular groove;
    inserting a bushing within said cap surrounding the keyed stem and in engagement with said stem retainer and said second shoulder;
    threading a nut having an internal circular groove with an o-ring retained therein into said cap with sufficient torque that the nut engages the bushing forcing the stem retainer against said first shoulder.

17. The method of claim 16 wherein the cap, valve body and retainer ring are of the same thermoplastic material.

18. The method of claim 17 wherein the thermoplastic material is one of polyethylene and polypropylene.

19. The method of claim 15 wherein the valve body and retainer ring are of the same thermoplastic material.

20. The method of claim 19 wherein the thermoplastic material is one of polyethylene and polypropylene.

* * * * *